United States Patent Office 3,217,957
Patented Nov. 16, 1965

3,217,957
WELDING APPARATUS
Alexander G. Jarvie, Washington, and Gerald E. Stimson, Pittsfield, Mass., assignors to General Electric Company, a corporation of New York
Filed Dec. 12, 1958, Ser. No. 780,148
3 Claims. (Cl. 228—1)

The present invention relates to welding equipment and more particularly to ultrasonic welding apparatus for making continuous seam welds.

In the past, methods for joining metallic materials have usually involved the application of heat, directly or by means of electrical energy, to locally melt the metal members and cause them to fuse into a solid metallurgical structure. In such processes, it is often necessary to employ added filler metals or chemical fluxes to protect the metal from oxidation during its molten stage.

In certain metal joining operations it is necessary to avoid the application of heat in the formation of a metallurgical bond. Spot welds of this nature have been achieved by prior processes using pressure welding techniques and more recently by ultrasonic spot welding, but these methods have certain drawbacks and are not suitable for producing continuous seam welds. Pressure welding, for example, results in drastic reduction of the thickness of the components being welded with accompanying losses in mechanical strength. Dragging of an ultrasonic spot welding rod along the work also is ineffective since the application of sufficient pressure to make a good weld also results in damage to the work as the rod is slid along.

It is an object of the invention to provide a means and method for joining metallic members with a continuous weld without the application of heat.

It is another object of the invention to provide a means and method for producing a continuous weld of the above type without excessive abrasion of the work or marked reduction of thickness of the welded parts, and which are suitable for use in joining thin gauge materials.

It is a further object of the invention to provide an ultrasonic continuous seam welding apparatus.

The above and other objects are attained in accordance with the invention by a welding apparatus comprising, in combination, means for producing vibrations of ultrasonic frequency, rotatable disc means acoustically coupled to the ultrasonic vibration means, and adapted to be in rolling engagement at its periphery with the work to be seam welded, the disc means being adapted to transmit the ultrasonic frequency vibrations to its periphery so that the latter vibrates at such frequency in a direction transverse the direction of its rotation, and means for moving the rotatable disc and the work relative to one another while the periphery of the disc means is in rolling engagement with the work and transmitting vibrations thereto.

The invention will be better understood from the following description taken in conjunction with the accompanying drawings, in which:

FIG. 3 is a perspective view of a part of the apparatus illustrating a modification of the invention.

Figure 1:
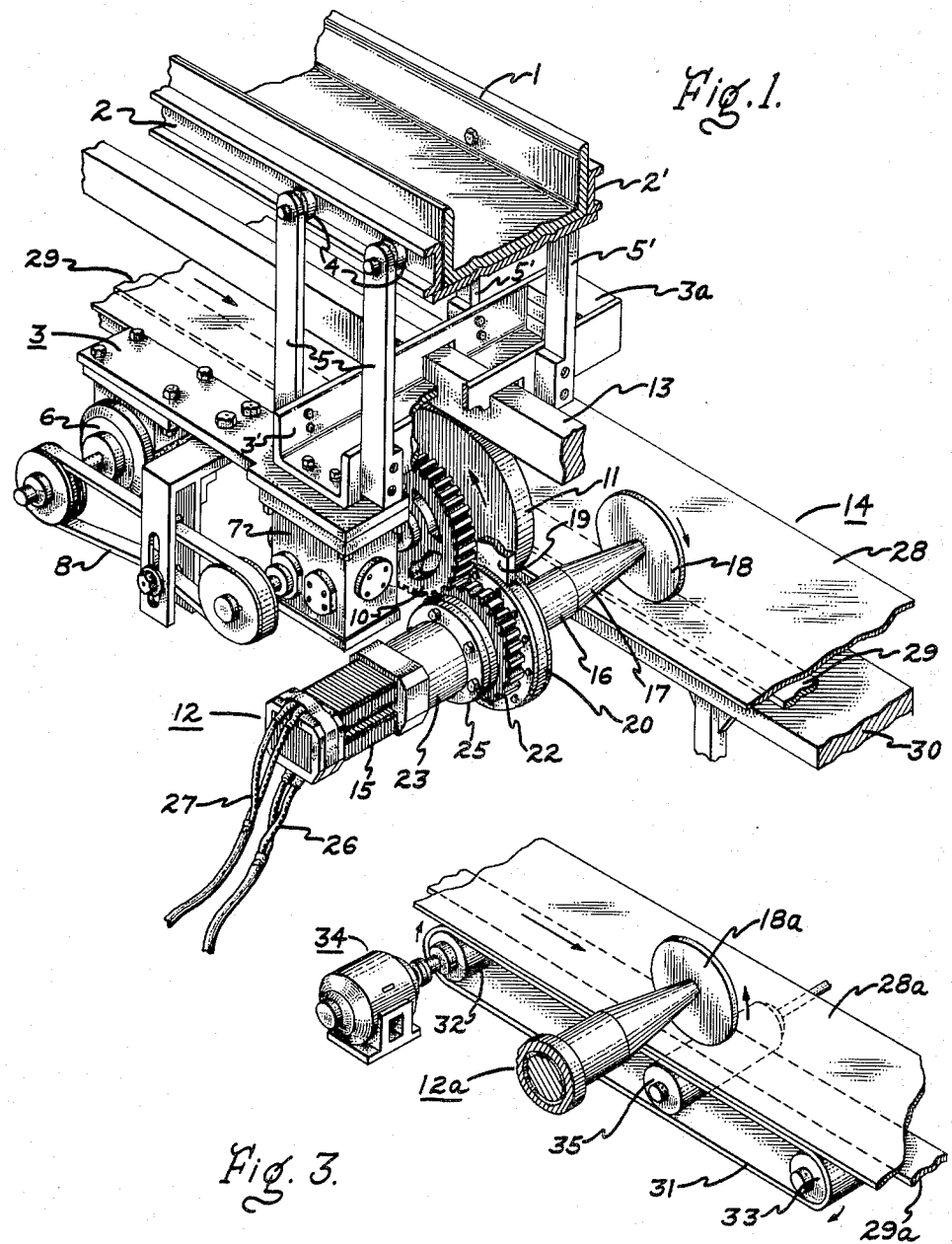
FIG. 1 is a perspective view of an embodiment of the ultrasonic seam welding apparatus of the invention.

Referring now to the drawings, and particularly to FIG. 1, the seam welding apparatus includes an elongated stationary support 1 having tracks 2, 2' from which carriage 3 is suspended by hanger members 5, 5'. Rollers 4, 4' on the upper ends of hanger members 5, 5', respectively, engage tracks 2, 2' and permit carriage 3 and associated parts to be rolled along support 1 with the weight of the suspended apparatus bearing on the tracks.

Secured to carriage 3 is motor 6 and gear box 7 containing a reduction gear assembly driven by motor 6 via belt drive 8. Operatively connected to gear box 7 by shaft 9 (see FIG. 2) is drive gear 10 and friction wheel 11, the direction of rotation of which is indicated by the arrow in FIG. 1. Drive gear 10 serves to rotate ultrasonic welding unit 12, hereinafter more fully described. Friction wheel 11 engages stationary track member 13 and during its rotation, in the direction indicated by the arrow, in rolling contact with track members 13 it serves to move carriage 3 and associated parts along support 1 and thereby transport the welding apparatus relative to the work 14 to be seam welded.

Figure 2:
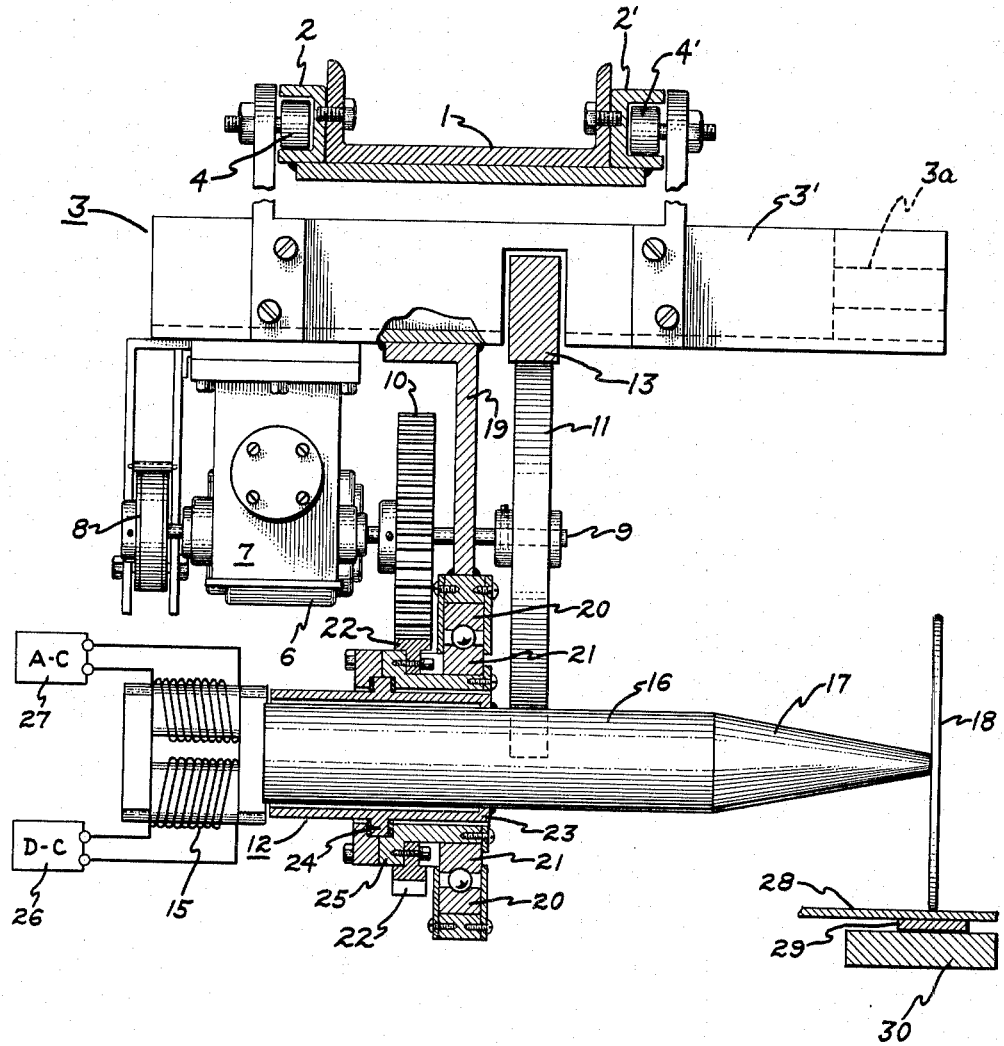
FIG. 2 is a side view partly in section of the apparatus of FIG. 1.

As shown more clearly in FIG. 2, welding unit 12 is constituted by transducer 15, coupling bar 16, displacement multiplier 17, and welding disc 18, all preferably fixedly joined to or integral with one another and rotatable as a unit relative to the work.

Welding unit 12 is mounted on carriage 3 by bracket 19 fixed at its upper end to cross-piece 3', which forms a part of carriage 3, and at its lower end to radial bearing 20 in which journal member 21 of welding unit 12 is rotatably mounted. Journal member 21 and driven gear 22, which engages and is driven by drive gear 10, are fixedly secured to welding unit 12. This attachment is made by means of sleeve 23 which is radially spaced from but joined at one end to coupling bar 16 and has an annular flange 24 on which collar 25 is clamped, driven gear 22 being fixed to collar 25.

Flange 24 is located at a nodal point of the vibration which is set up at a resonant frequency in coupling bar 16 by the output of transducer 15. By thus mounting welding unit 12 on carriage 3 at a point of minimum vibration, a damping effect on the ultrasonic vibrations produced by transducer 15 is avoided, and the vibratory energy is efficiently transmitted to welding disc 18 for making an effective seam weld.

Transducer 15, which may be of a known magnetostriction type, comprises a stack of punched nickel laminations to which is connected a D.-C. voltage polarization source 26 and an A.-C. source 27 for generating vibrations of desired ultrasonic frequency in transducer 15. Transducer 15 converts the high frequency electrical energy to mechanical vibratory energy which it transmits to coupling bar 16 directly joined, as by brazing or the like, to the end of transducer 15. Coupling bar 16 in turn transmits the vibratory energy at ultrasonic frequency to a tapering bar or so-called displacement multiplier 17 which simultaneously amplifies and transmits the vibrations to welding disc 18, which is joined at its center to bar 17. Displacement multiplier 17 acts as a mechanical focusing device and increases the amplitude of vibration in proportion to the design configuration of the multiplier itself. It may, if desired, be of exponential form, wherein it has a contour varying from base to tip in accordance with an exponential function, as well known in the art, to provide maximum amplifying effect in transmitting the ultrasonic vibrations to welding disc 18.

Welding disc 18 is driven at its center by the vibrations received from conical bar 17 and thus has flexural waves produced therein which radiate to the outer periphery of the disc 18, which is in rolling contact with the work to be welded. As a result, the periphery of disc 18 including the portion in contact with the work vibrates at ultrasonic frequency in a direction transverse the rolling direction. Preferably, the peripheral edge of disc 18 is made convex to avoid risk of damage to the work piece by the rapidly oscillating edge.

The lapped work pieces which in FIG. 1 are shown as a metallic sheet 28, such as aluminum foil, and a metal strip 29 rest on a fixed support 30, while welding wheel 18 bears on the work pieces with suitable pressure as it rolls over them.

In the illustrated embodiment, the necessary pressure for the welding operation is provided by placing suitable weights 3a on the end of cross-piece 3' of carriage 3 so as to provide the desired moment of force about rollers 4, 4' as a fulcrum and thereby apply the desired pressure between wheel 18 and the work. For this purpose, sufficient clearance between the rollers 4, 4' and their respective tracks 2, 2' should be provided to enable such tipping of the rollers as is needed. Likewise, sufficient clearance is provided between contact bar 13 and cross-piece 3', as shown in FIG. 2, to allow the necessary tilting of the suspended apparatus.

Instead of moving welding unit 12 along the work as in the FIG. 1 arrangement, the work may be moved relative to welding unit 12. FIG. 3 shows an arrangement of the latter type, which includes an endless belt conveyor 31 mounted on rollers 32 and 33, roller 32 being driven by suitable motor means 34. In this embodiment, unit 12a is not movable along the work but is free to rotate, so that as the work 28a, 29a is longitudinally moved by conveyor 31, it comes into rolling engagement with welding wheel 18a. To ensure adequate support for the work at the welding area, auxiliary roller 35 is fixed in rolling engagement with belt 31 directly beneath the point of contact between work 28a and welding wheel 18a.

The flexural waves propagated in wheel 18 in the described arrangements result in the transmission of high frequency vibrations of the upper work piece 28 with relation to the lower work piece 29, which remains stationary relative to the supporting surface. This relative motion of the contacting surfaces of the work pieces results in a breakdown of surface films on the work pieces accompanied by a plastic fusion which leads to a metallurgical bond at points of high unit stress. The weld is created in a continuous band of narrow width as the wheel 18 rolls along the work at a predetermined rate.

Microscopic examination of typical welds made by the described apparatus has indicated that the welded area is formed of a continuous metallic structure across the original interface of the overlapped workpieces, interspersed (principally at the margins of the weld) with discontinuous pockets of included surface oxides.

Effective welds of the above type using the described apparatus may be made between similar or dissimilar metals, and with metals of widely varying thickness and form. The invention is of particular benefit, however, in making continuous seam welds of very thin sheets or foils, e.g., of the order of 1 mil or less, since the described apparatus does not rely on extreme pressures or elevated temperature in making the weld, as heretofore characteristic of prior types of welding apparatus.

The components of welding unit 12 must be carefully designed and constructed in accordance with acoustical engineering principles to provide for the system to vibrate in resonance at a selected fundamental frequency. As indicated above, care must also be taken to avoid damping effects in the mounting of the unit and its components, so that vibrational energy losses are held to a minimum. For this reason, the joining of the parts directly to one another such as by brazing, or, ideally, by forming the adjacent parts of the units so far as possible from a single piece of stock, is preferable to threaded or bolted connections, in order to attain maximum welding efficiency.

The frequency of applied vibration is fixed by the resonant output frequency of transducer 15. Wheel 18 must be tuned to this frequency and factors taken into account in providing a properly tuned wheel include the particular thickness and diameter of the wheel, the load placed on it, the point at which it is driven, and the material on which it is made.

The following is a description of a particular construction which has been used with excellent results to produce effective continuous seam welds between aluminum foil of 1½ mil thickness and a flat aluminum bar of ¼ inch thickness, it being understood that the dimensions and values may be appropriately varied from those given to achieve the desired welding conditions in accordance with the principles of the invention.

The power supply used was an electronic type generator capable of delivering up to 2000 watts of energy and of being adjusted to a desired frequency. In the present case the frequency selected was that corresponding to the 21.6 kilocycle per second resonating frequency of a conventional magnetostriction transducer comprising a stack of 12 mil thick nickel laminations formed of window-type punchings carrying an A.-C. field winding on one leg of the core and a D.-C. polarizing coil on the opposite leg.

Brazed to the end of the transducer was a solid cylindrical coupling bar of mild steel 2 inches in diameter and 9¼ inches in length, the latter dimension corresponding to a full wave length for the particular system described. A supporting sleeve structure attached to the coupling bar and on which the welding unit was secured was arranged and constructed substantially in the manner and relationship shown in FIG. 2 of the drawing, with the flange 24 spaced ¼ wavelength from the transducer end of coupling bar 16 and the connection of sleeve 23 to bar 16 at the ½ wavelength point. The displacement multiplier was a solid bar of mild steel, and had a base diameter of 2 inches tapering in a cone to ½ inch diameter with a length of 4⅝ inches.

The welding wheel, also of mild steel, had a diameter of 5½ inches and a thickness of 5/32 inch.

In this particular apparatus a load of 25 pounds was applied on the wheel and the linear speed of travel of the welding unit along the work was adjusted to about 50 inches per minute.

By virtue of the invention as described herein, there is provided a means for continuous seam welding of a variety of metallic materials which offers marked advantages over prior welding devices and methods. The apparatus effectively welds metals without the application of heat and thereby preserves the mechanical and physical properties of the original materials, and also avoids damage to adjacent inflammable or heat sensitive materials. Moreover, workpieces need not be pre-cleaned in order to enable effective welds to be made with the described apparatus. Of particular importance is the avoidance by the present device of the deformation and damage to workpieces, especially those of thin gauge, which would otherwise occur in the use of heat, high pressure, dragging and other procedures heretofore employed in prior methods and devices.

The described device has been found of particular value in attaching electrical taps and leads to electrode foils of foil wound electrical apparatus, such as transformers and capacitors. It will be obvious, however, that it may be used for a variety of other types of applications.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What we claim as new and desire to secure by Letters Patent of the United States is:

1. Welding apparatus comprising, in combination, means for producing vibrations of ultrasonic frequency, coupling means secured to said vibration producing means for transmitting said ultrasonic frequency vibrations, rotatable disc means acoustically coupled at its center to said coupling means and constructed to vibrate in resonant frequency with said vibration producing means and adapted to be in rolling engagement at its periphery with work to be seam welded, said disc means being adapted to transit said ultrasonic frequency vibrations to its periphery so that the latter vibrates at said frequency transversely to the plane of said disc means, said vibration producing means, coupling means, and disc means being mounted for rotation about an axis as a unit relative to the work, elongated support means, carriage means on and movable along said elongated support means, said carriage means being secured to said rotatable welding unit at a nodal point of the vibrations transmitted therein, and means on said carriage means for rotating said rotatable unit and for moving said carriage means together with said rotatable unit relative to the work to be welded in a direction transverse said axis while the periphery of said disc means is in rolling engagement with the work and transmits ultrasonic frequency vibrations thereto.

2. Welding apparatus comprising, in combination, means for producing vibrations of ultrasonic frequency, coupling means secured to said vibration producing means for transmitting said ultrasonic frequency vibrations, rotatable disc means acoustically coupled at its center to said coupling means and constructed to vibrate in resonant frequency with said vibration producing means and adapted to be in rolling engagement at its periphery with work to be seam welded, said disc means being adapted to transmit said ultrasonic frequency vibrations to its periphery so that the latter vibrates at said frequency transversely to the plane of said disc means, said vibration producing means, coupling means, and disc means being mounted for rotation about an axis as a unit relative to the work, elongated support means, carriage means on and movable along said elongated support means, said carriage means being secured to said rotatable welding unit at a nodal point of the vibrations transmitted therein, and means on said carriage means for rotating said rotatable unit and for moving said carriage means together with said rotatable unit relative to the work to be welded in a direction transverse said axis while the periphery of said disc means is in rolling engagement with the work and transmits ultrasonic frequency vibrations thereto, said carriage means being tiltable on said elongated support transverse thereto, and means for applying a load of predetermined amount on said carriage means for tilting the same, so as to apply thereby a pressure of predetermined amount between said rotatable disc means and the work to be welded.

3. Welding apparatus comprising, in combination, means for producing vibrations of ultrasonic frequency, coupling means secured to said vibration producing means for transmitting said ultrasonic frequency vibrations, rotatable disc means acoustically coupled at its center to said coupling means and constructed to vibrate in resonant frequency with said vibration producing means and adapted to be in rolling engagement at its periphery with work to be seam welded, said disc means being adapted to transmit said ultrasonic frequency vibrations to its periphery so that the latter vibrates at said frequency transversely to the plane of said disc means, said vibration producing means, coupling means, and disc means being mounted for rotation about an axis as a unit relative to the work, and means for moving said rotatable unit relative to the work in a direction transverse to said axis while the periphery of said rotatable disc means is in rolling engagement with the work, said moving means comprising elongated support means, carriage means mounted on said support means for movement therealong, first drive means on said carriage means for rotating said unit about said axis, stationary track means, and second drive means on said carriage means engageable with said track means for moving said carriage means and said rotatable unit together therewith along said elongated support means, the speed of said carriage means and rotatable unit along said elongated support being synchronized with the rolling speed of said rotatable disc means.

References Cited by the Examiner

UNITED STATES PATENTS

| | | | |
|---|---|---|---|
| 1,728,812 | 9/1929 | Tobey | 219—82 |
| 1,965,521 | 7/1934 | Cutter | 219—81 |
| 2,050,026 | 8/1936 | Tarbox | 29—504 |
| 2,222,906 | 11/1940 | Hentzen | 78—92 |
| 2,263,038 | 11/1941 | Heim | 219—82 |
| 2,322,796 | 6/1943 | Fentress | 219—81 |
| 2,515,264 | 7/1950 | Rasmusen | 219—82 |
| 2,697,954 | 12/1954 | Sowter | 29—470.1 |
| 2,780,716 | 2/1957 | Wasilisin et al. | 219—82 |
| 2,804,725 | 9/1957 | Dench | 51—59 |

FOREIGN PATENTS 1,087,440   8/1954   France.

OTHER REFERENCES

"Ultrasonic Welding Hunts Bigger Game," American Machinist, McGraw-Hill (Dec. 29, 1958).

CHARLES W. LANHAM, *Primary Examiner.*

WILLIAM W. DYER, JR., THOMAS E. BEALL, WILLIAM J. STEPHENSON, *Examiners.*